United States Patent

[11] 3,620,298

| [72] | Inventors | Robert H. Somerville<br>Richland;<br>Lewis P. Bakker, Kennewick, both of Wash. |
|---|---|---|
| [21] | Appl. No. | 57,041 |
| [22] | Filed | July 22, 1970 |
| [45] | Patented | Nov. 16, 1971 |
| [73] | Assignee | McDonnell Douglas Corporation |

[54] CONTINUOUS HEAT PIPE AND ARTERY CONNECTOR THEREFOR
10 Claims, 10 Drawing Figs.

[52] U.S. Cl. .................................... 165/105,
285/244, 285/371, 285/398
[51] Int. Cl. ........................................ F28d 15/00
[50] Field of Search........................... 165/105;
285/244, 371, 398

[56] References Cited
UNITED STATES PATENTS

| 89,373 | 4/1869 | Abbott | 285/398 X |
| 167,262 | 8/1875 | Lewis | 285/371 X |
| 1,329,121 | 1/1920 | Hachman | 285/371 X |

FOREIGN PATENTS

| 919,620 | 10/1954 | Germany | 285/398 |

OTHER REFERENCES

Katzoff, S., Notes On Heat Pipes etc., Proceedings of Joint AEC/Sandia Labs Heat Pipe Conf., 10/1966, pgs. 72– 83, (SC-M-66-623 Microfische).

*Primary Examiner*—Albert W. Davis, Jr.
*Attorneys*—Walter J. Jason, Donald L. Royer and D. N. Jeu ABSTRACT: Continuous, annular, artery-type wick heat pipe is obtained by forming a predetermined length of container tube including an artery-type wick therein into a desired annular configuration and joining abutting artery ends with a connector means comprising an insert and two securing spring sleeves, the joint being completed by butt welding the ends of the outer container tube together. The insert and spring sleeves of the connector means have cooperating configurations and dimensions which provide a self-aligning and firm artery connection wherein an integral (nonleaking) artery structure is maintained. Sharp bends such as a right angle corner can be provided in an artery-type wick heat pipe by use of suitably modified connector means.

PATENTED NOV 16 1971 3,620,298

INVENTORS
ROBERT H. SOMERVILLE
LEWIS P. BAKKER

BY Dock N. Jen
—AGENT—

INVENTORS
ROBERT H. SOMERVILLE
LEWIS P. BAKKER

BY
-AGENT-

PATENTED NOV 16 1971  3,620,298

INVENTORS
ROBERT H. SOMERVILLE
LEWIS P. BAKKER

BY
-AGENT- 3,620,298

CONTINUOUS HEAT PIPE AND ARTERY CONNECTOR THEREFOR

BACKGROUND OF THE INVENTION

Our present invention pertains generally to the field of heat pipes and more particularly to a continuous, artery-type wick, heat pipe and an artery connector therefor.

A conventional heat pipe includes a closed chamber which contains an isotropic wick and a working fluid. The closed chamber is usually in the form of a sealed tube and the wick is made of a suitable capillary material such as a fine-pore wire mesh lining the inner walls of the tube to provide a capillary flow return path for condensed vapor. The wire mesh is an isotropic wick in that it is a porous structure which does not contain a low-resistance liquid return path or passageway (artery) for condensed vapor. The wick is normally saturated with a suitable wetting liquid (working fluid).

When the heat pipe is heated at one end, for example, the fluid vaporizes at the heat input location causing a slight pressure increase which forces the vapor to flow to the cooler, lower pressure end where it condenses. The vapor which is condensed in the condenser region is returned through the wick to the evaporator region by capillary action. Of course, heat is rejected at the condenser region or heat output location of the heat pipe to some external heat sink. The heat pipe can respond automatically to heat applied at any point along its length and distribute that heat with only a very small temperature drop, and is equivalent to a material having a thermal conductivity exceeding that of any presently known metal by a very large factor. The conventional heat pipe is shown and described in greater detail and claimed in the U.S. Pat. No. 3,229,759, of George M. Grover for Evaporation-Condensation Heat Transfer Device patented Jan. 18, 1966.

A heat pipe usually operates with an appreciable internal pressure which is determined by the working fluid vapor pressure. The container tube or heat pipe envelope is commonly a cylindrical structure having a circular cross section, with wall thicknesses selected to withstand the internal pressures. Working fluid selection is based on its thermophysical properties, chemical stability and compatibility with the container tube and wick materials. The criteria for selecting the wick structure includes its resistance to working fluid circulation, capillary pumping capacity and evaporative heat flux capabilities. Maximum heat pipe performance is, however, often limited by the ability of the wick to deliver liquid to the evaporator region or heat input location.

The capillary pumping pressure in a heat pipe is equal to the sum of the pressure drops in the liquid phase, the vapor phase and pressure resulting from differences in gravity or acceleration head, the latter pressure being normally zero in a gravity-free environment such as outer space. The heat pipe can operate in opposition to gravity to a certain extent and will work well under gravity-free conditions. The liquid phase pressure drop in a heat pipe is generally of the order of 50 or more times greater than the vapor phase pressure drop. The liquid phase pressure drop also depends greatly upon the wick configuration used, and artery-type (low flow resistance) liquid return wicks generally have pressure drops of about 1/100th that of isotropic wicks in container tubes identical to those containing the artery-type wicks. Thus, artery-type wicks are highly desirable in long heat pipes which are often needed for various applications.

At present, artery-type wick heat pipes are limited as to the length that they can be fabricated. Screen (wire mesh) pulling friction at assembly, length of extrusion (container tube) that can be produced, floor space normally available and ease of handling finished assemblies are all limiting factors. An annular heat pipe can be formed by bending a straight heat pipe sealed at each end into a ring. More stringent operating conditions are placed on such an annular heat pipe; however, with existing methods, the manufacture of a continuous annular heat pipe, or one with a sharp bend in it, is impossible. Heat pipe arteries are, of course, normally located internally of their respective container tubes and are preferably made of wire mesh. Such arteries are difficult to reach and work on. There has been no connector device available for artery-type wick heat pipes that will perform the function of connecting an internal heat pipe artery fabricated from wire mesh to another similar one while allowing continuous flow of the working fluid through the connection and, at the same time, sealing the (connected) artery from vapor entry. Most importantly, debilitating liquid leakage should not occur at the closed artery connection and this is extremely difficult to accomplish or detect since the internal artery connection is obscured by the abutting container tube ends and cannot be easily inspected or adjusted.

SUMMARY OF THE INVENTION

Briefly, and in general terms, our invention is preferably accomplished by providing a continuous, annular, artery-type wick heat pipe produced by forming a predetermined length of container tube including an artery-type wick therein into a desired annular configuration and joining abutting artery ends with a connector means comprising an insert element and two securing spring sleeve elements, the joint being completed by butt welding the ends of the outer container tube together. The predetermined length of container tube carrying its artery-type wick is shaped to the desired configuration on an appropriate metal-forming fixture and the connector means is properly installed on the artery ends by a special assembly tool.

The insert element and spring sleeve elements of the connector means have cooperating configurations and dimensions which provide a self-aligning and firm artery connection wherein an integral nonleaking artery structure is maintained to seal it against vapor entry at the abutting artery ends and preclude any debilitating liquid leakage through a web portion thereof. Sharp bends such as a right-angle corner can be provided in an artery-type wick heat pipe by use of suitably modified connector means. In such instances, the insert element of a connector means is the element which is mainly modified, generally to conform or axially align its passageway with that of the bend desired or required.

BRIEF DESCRIPTION OF THE DRAWINGS

Our invention will be more fully understood, and other features and advantages thereof will become apparent, from the following detailed description of certain exemplary embodiments of the invention. The detailed description is to be taken in conjunction with the accompanying drawings, in which.

DESCRIPTION OF THE PRESENT EMBODIMENTS

Figure 1:
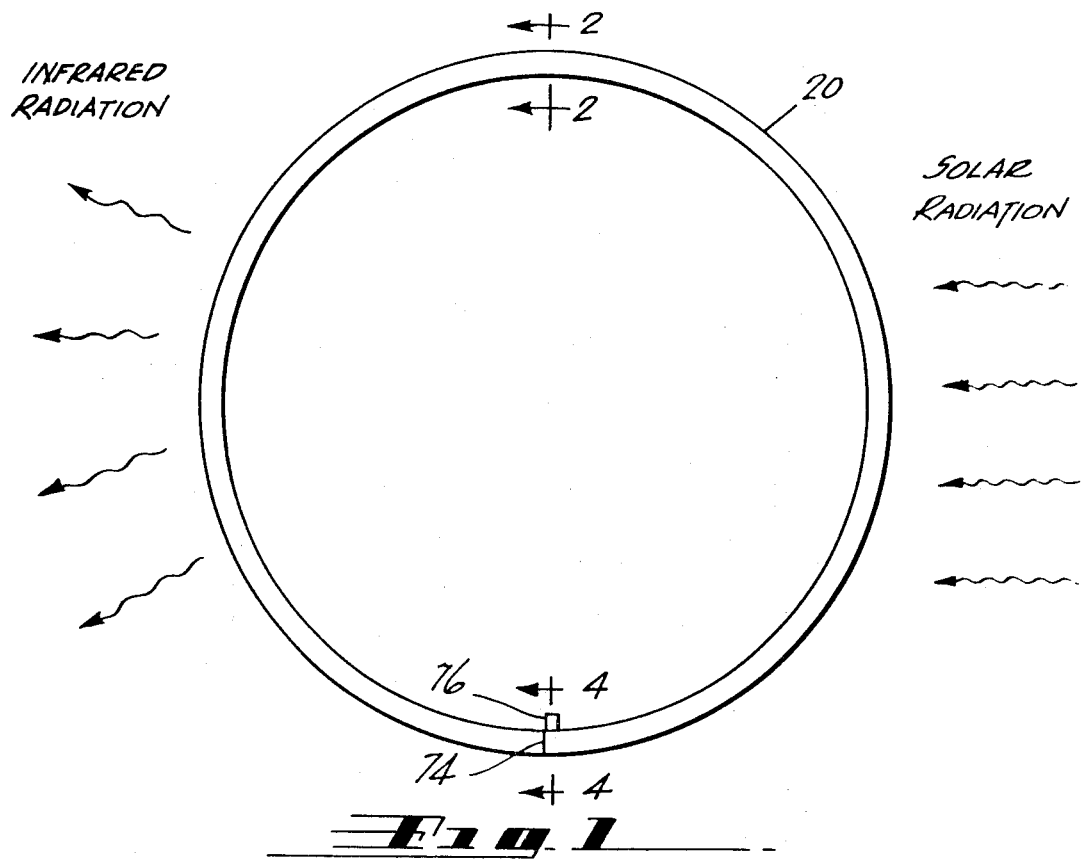
FIG. 1 is a front elevational view of a continuous, annular, artery-type wick heat pipe constructed in accordance with this invention.

FIG. 1 is a front elevational view of a continuous, annular, artery-type wick heat pipe 20 which was fabricated in accordance with our invention. The heat pipe 20 can be one of a number of similar heat pipes which are, for example, embedded between and in contact with face sheets of the honeycomb wall of a cylindrically shaped shell structure (not shown). These heat pipes can be circumferentially positioned in the shell structure in planes perpendicular to its axis and suitably spaced longitudinally at preferably equal intervals from each other. Where the shell structure is located in free space orbiting the earth, considerable thermal energy is absorbed from the sun by the structure. Without the heat pipes, the sunlit side of the structure can become quite hot (about 160° F.) while the shaded side remains very cold (about −100° F.). During eclipse when the shell structure is in the earth's shadow, a minimum temperature of −190° F. can be reached by the entire structure.

In order to help achieve thermal equalization of the shell structure, the inner and outer face plates of its honeycomb wall can be made of aluminum, for example. This provides adequate longitudinal thermal paths for the shell structure (the sun's rays normally being nearly perpendicular to its axis), but the thermal conductance circumferentially is grossly inadequate for sufficient heat transfer by conduction from the sunlit side to the shaded side. With an isothermal shell structure, about one half of the absorbed solar heat will be reradiated immediately into space and the other half must be carried away by conduction through adequate thermal paths. The heat pipes 20 provide the large effective thermal conductivity needed circumferentially to produce thermal equalization between the sunlit and shaded sides of the shell structure.

Figure 2:
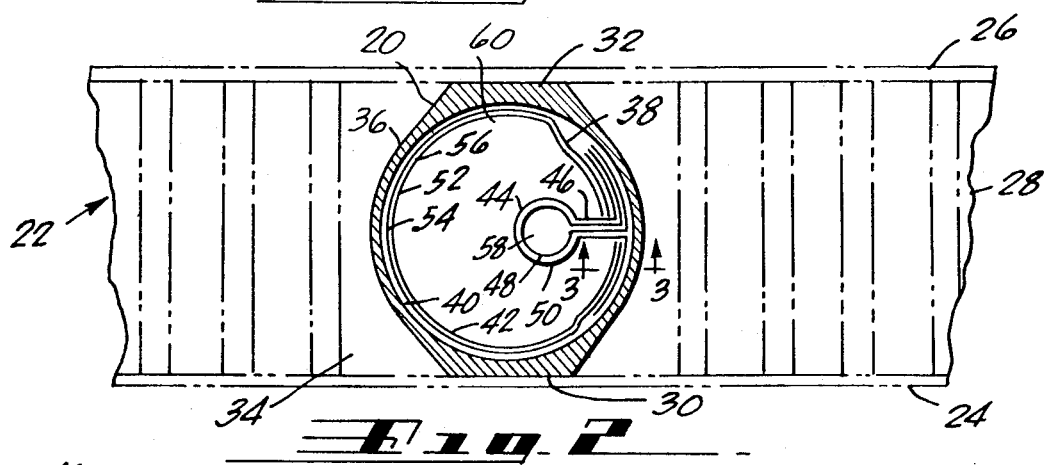
FIG. 2 is a cross-sectional view of the continuous heat pipe as taken along the line 2—2 indicated in FIG. 1.

FIG. 2 is a cross-sectional view of the continuous heat pipe 20 as taken along the line 2—2 indicated in FIG. 1. The honeycomb wall 22 including its metallic inner and outer face plates 24 and 26, and lightweight core 28, are shown in phantom lines. The heat pipe 20, in this instance, has flat surfaces 30 and 32, and is suitably installed in a channel 34 with the flat surfaces in contact respectively with the face plates 24 and 26. Heat pipe 20 includes container tube 36, artery-type wick 38 and a suitable working fluid (not indicated). The tube 36 can be an aluminum extrusion having a circular cross-sectional passageway 40. The diametrical perpendicular distance between the flat surfaces 30 and 32 is 0.5 inch, and the tube 36 can have a wall thickness of approximately 0.03 inch generally, for example. Wick 38 actually includes a capillary isotropic wick portion 42 and a low-resistance return structure or artery wick portion 44. The isotropic wick portion 42 provides the usual peripheral (capillary) liquid return path which is of minor or secondary usage in this heat pipe whereas the artery wick portion 44 provides an axial (artery) liquid return path of major or primary usage. The artery wick portion 44 is connected to the isotropic wick portion 42 by a longitudinal web 46. The working fluid is, for example, very high purity anhydrous ammonia, and a small amount of inert gas (helium) was added to permit recovery of operation after any freezing period of the ammonia.

The artery wick portion 44 can be fabricated from two layers 48 and 50 of 200-mesh×0.002-inch diameter stainless steel wire screen formed over a round mandrel and spot welded together along the web 46. The free ends beyond the web 46 are then spread apart with three layers to one side and the remaining layer to the other side, and formed to fit the inside surface or wall of the passageway 40. The isotropic wick portion 42 can be also fabricated from two layers 52 and 54 of stainless steel wire screens which are cut and formed wide enough to act, when positioned in the passageway 40, as springs or wedges to hold themselves and the free ends of the artery wick portion 44 tightly against the wall of the passageway. The radially inner layer 52 was made from 105-mesh×0.003-inch diameter wire screen to provide added structural rigidity to outer layer 54 which was made of 200-mesh×0.002-inch diameter wire screen having relatively little stiffness. It is noted that all of the wire screens in the cross-sectional view of FIG. 2 have been drawn in plain lines instead of the usual cross-sectional symbol for wire screens, for clarity of illustration.

The pressure drop available to drive the liquid through the isotropic wick portion 42 can be made positive by using a sufficiently small screen pore size. For very small pores, however, the increased viscous drag would obviously hamper the capillary pumping action. Surface tension at appropriate size pores in the evaporator region of the heat pipe draws liquid through the isotropic wick portion 42 and keeps the capillaries therein properly filled with liquid. Of course, a correct amount of liquid (working fluid) is included in the isotropic wick portion 42 so that the surface curvature (surface tension) at the pores in the condenser region is relatively low and does not produce any appreciable negative capillary force. The two wire screen layers 52 and 54 are used to produce a suitably functioning capillary channel 56. The diameter of the radially inner artery layer 48 or artery channel 58 inner diameter is 0.094 inch, and the diameter of the radially inner capillary layer 52 or vapor channel 60 inner diameter is 0.40 inch, for example.

Figure 3:
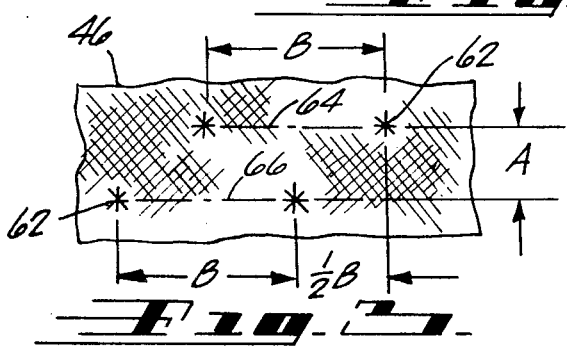
FIG. 3 is a fragmentary plan view of a web portion of the artery-type wick used in the continuous heat pipe, as taken along the line 3—3 indicated in FIG. 2 and rotated 90° clockwise.

FIG. 3 is a fragmentary plan view of the web 46 alone, as taken along the line 3—3 indicated in FIG. 2 (and rotated 90° clockwise) with the other parts of the heat pipe 20 omitted for clarity of illustration. Spot welds 62 can be used to secure the layers 48 and 50 together along the web 46. Two lines 64 and 66 of spot welds 62 separated radially by a distance A are preferably used. The spot welds 62 are longitudinally spaced apart at a distance B in both of the lines 64 and 66 wherein their respective spot welds are staggered halfway relative to each other. The distances A and B are respectively 0.05 inch and 0.12 inch in this example. It is to be noted that the layers 48 and 50 (FIG. 2) must be held closely together throughout the length of the web 46 by the spot welds 62, otherwise possible leakage of liquid flowing in the artery channel 58 can occur through the loose or separated points of the web which connects with the artery channel.

A straight length of the container tube 36 with wick 38 installed therein is formed into the desired circular shape in a two-step process. In the first step, a disc-shaped metal fixture (not shown) having a milled groove in its periphery accepts and grips the profile of the tube 36 (with its wick 38 installed therein) to prevent any twisting thereof during forming. Roller forming guides mounted on a rotating arm were used to follow the tube 36 and press it to the metal forming fixture. This fixture was sized to produce a circular heat pipe of, for example, 56 inches in outside diameter when the tube 36 was fitted tightly in the milled groove of the metal fixture. In the second step, the formed tube 36 with its installed wick 38 was overformed in a similar disc-shaped fixture (also not shown) having a smaller forming disc for producing a temporary helical heat pipe sufficiently smaller in diameter so that the springback of the tube 36 and its installed wick 38 results in the desired 56-inch diameter circular heat pipe. The formed heat pipe is sufficiently flexible to allow its ends to be easily pulled apart and closed for the connection and joining process.

Figure 4:
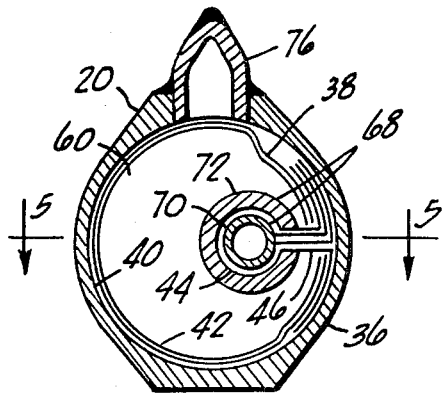
FIG. 4 is a cross-sectional view of the continuous heat pipe as taken along the line 4—4 indicated in FIG. 1.

FIG. 4 is a cross-sectional view of the continuous heat pipe 20 as taken along the line 4—4 indicated in FIG. 1. The ends of the artery wick portion 44 (FIG. 2) of wick 38 are properly joined together by connector means 68 including an insert element 70 and two substantially identical sleeve elements 72. The abutting ends of the container tube 36 are butt-welded together along junction 74 (FIG. 1) with the ends of the isotropic wick portion 42 of wick 38 in registry and contiguous contact within the closed tube. Of course, the ends of the web 46 are also in registry and contiguous contact within the closed tube 36. Working fluid loading can be accomplished by transferring a predetermined amount of fluid from a metered volume tank (not shown) connected through a suitable control valve to filler tube 76 of the heat pipe 20 which has been thoroughly evacuated. After loading, the tube 76 is pinched off and its tip can be fusion welded.

Figure 5:
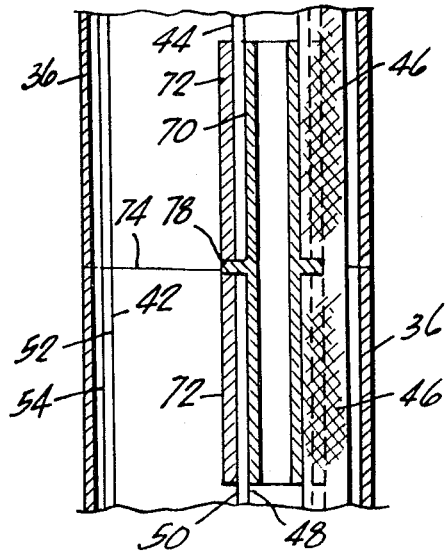
FIG. 5 is a fragmentary sectional view of the continuous heat pipe as taken along the line 5—5 indicated in FIG. 4.

FIG. 5 is a fragmentary sectional view of the continuous heat pipe 20 as taken along the line 5—5 indicated in FIG. 4. It can be seen from this view that the insert element 70 is a small connecting tube having a longitudinally central flange 78. The insert element 70 is inserted into and joins the ends of the artery wick portion 44 such that the end edges of layers 48 and 50 abut against the sides of the flange 78 while the end edges of the layers 52 and 54 of the isotropic wick portion 42 are in contiguous contact adjacent junction 74 of the container tube 36. Sleeve elements 72 are cut longitudinally to provide a narrow slit in each element to accommodate the web 46. The sleeve elements 72 are spring elements which concentrically crushes the artery ends to the insert element 70 to seal the artery from vapor entry. The flange 78 provides flat surfaces against which the ends of the artery wick portion 44 can abut and prevent the insert element 70 from creeping in either direction farther into the artery ends. The insert element 70, of course, provides continuity of working fluid (return liquid) flow therethrough. Heat pipe joints utilizing the connector means 68 have been thoroughly tested and found to be functionally efficient and mechanically sound.

It was found during early testing of the continuous heat pipe 20 and its connector means 68 that it was necessary to have the insert element 70 fit closely or snugly in the ends of the artery wick portion 44 and that the spring sleeve elements 72 compress the artery ends firmly against the insert element in order to provide the basis for a good seal. Certain difficulties were, however, still encountered with the continuous heat pipes having such connections and seals. The fact that the internal artery joint cannot be completed without closing the ends of the outer container tube 36 greatly increased the problem since the joint normally cannot then be adjusted or even seen. Of course, it was possible that some of the difficulties were due to improper installation of, or damage incurred while installing, the connector means 68. Also, a large and substantial connector means can absorb an excessive amount of heat over the joint and cause burn-out of the heat pipe. The absorbed heat can produce nucleate boiling without drying the wick and the resulting vapor bubbles may block the liquid return passages to cause burn-out. The solution to these problems involved the provision of connector means of certain relative dimensions and characteristics, and a means for properly installing the same in the heat pipe 20.

Figure 6:
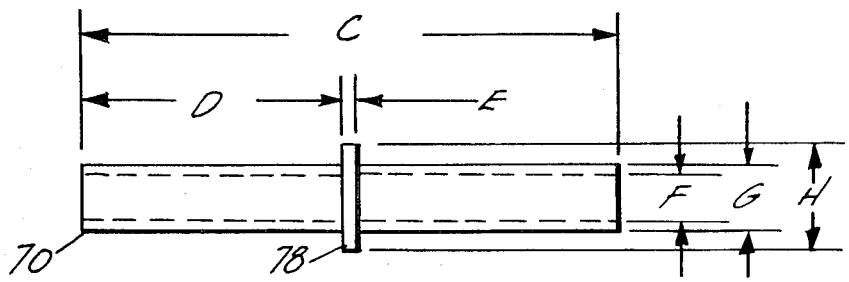
FIG. 6 is a front elevational view of the insert element of the connector means used to join the abutting artery ends in the continuous heat pipe shown in FIG. 1.
Figure 7:
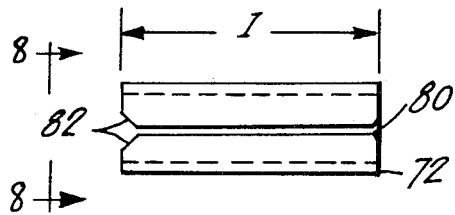
FIG. 7 is a front elevational view of a spring sleeve element of the connector means used to join the abutting artery ends in the continuous heat pipe of FIG. 1.
Figure 8:
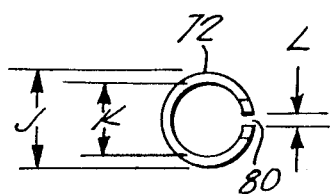
FIG. 8 is a side elevational view of the spring sleeve element as taken along the line 8—8 indicated in FIG. 7.

FIGS. 6, 7 and 8 are different views of the insert and sleeve elements 70 and 72 which were found suitable for a satisfactory connector means 68 in the heat pipe 20. The insert element 70 in FIG. 6 is, for example, made of type 304—SST stainless steel and has dimensions C, D, E, F, G and H as indicated. The sleeve element 72 is FIGS. 7 and 8 is also made of the same material and has dimensions I, J, K and L as indicated. The wall thickness of the insert element 70 is preferably as thin as possible while retaining adequate structural strength, and the wall thickness of the sleeve elements 72 is sufficiently thick to produce a firm spring action on the artery ends against the insert element therein. It was mentioned above that the insert element 70 should fit closely or snugly in the ends of artery wick portion 44. This requirement, however, generally results in creating a V-shaped space or gap between the ordinarily contiguous and parallel layers 48 and 50 of the web 46. For example, it can be seen that the layers 48 and 50 in FIG. 2 are shown horizontally parallel in the web 46. When a snug insert element 70 is inserted into the artery wick portion 44, its circular cross section is stretched somewhat such that a V-shaped gap is usually produced eventually between the normally contiguous surfaces of the inner layer 48 in the web 46. Of course, leakage of liquid from the artery channel 58 can occur through this gap.

The V-shaped gap can be prevented or eliminated by the sleeve elements 72 which firmly compress and conform the layers 48 and 50 against the insert element 70 therein. Each sleeve element 72 has a narrow longitudinal slit 80 for accommodating the web 46 therein. The opposing walls of the slit 80 or edges of each sleeve element 72 are contiguous with respective faces of the web 46 as shown in FIG. 4. This clearly prevents any separation of the layers 48 and 50 in the web 46 to form a V-shaped gap therebetween. Nevertheless, a slight amount of leakage still occurred with the connector means 62 and this leakage could not be precluded by using sleeve elements 72 with a stronger spring action. The sleeve elements 72 serve largely as artery contour constraining devices and a stronger spring action merely increased the difficulty of their installation without gaining any additional benefit.

For a proper connection and seal, it was subsequently found further that the insert element 70 should have a connection length at each end relative to its diameter of the order of about 5 to 1, and each sleeve element 72 should have a length which is at least approximately or nearly equal to the connection length at each end of the insert element. Thus, in FIGS. 6 and 7, D/G is of the order of about 5/1 and D is approximately equal to I. A good seal is not obtained where the insert element 70 is too short (relative to the artery diameter) and, where it is too long, the connection may absorb an excessive amount of input heat. When the length of the sleeve element 72 is not approximately equal to the connection length at each end of the insert element 70, the V-shaped leakage gap can be formed in the web 46 where the sleeve element does not constrain it. From these considerations, the dimensions C through L in FIGS. 6 through 8 have illustrative nominal values of 1.00, 0.496, 0.006, 0.076, 0.094, 0.126, 0.48, 0.128, 0.105 and 0.011 inch, respectively. Each sleeve element 72 has a small 45° chamfer 82 at one end of its slit 80 to facilitate installation of the sleeve element on the web 46.

Figure 9:
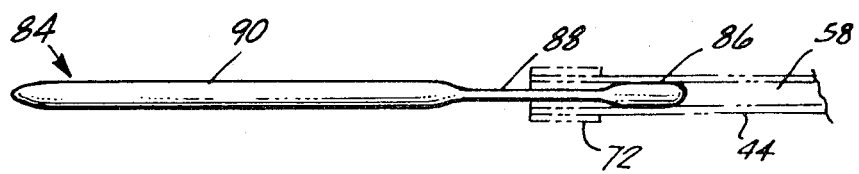
FIG. 9 is a front elevational view of a special assembly tool used to install the spring sleeve element properly on an artery end.

FIG. 9 is a front elevational view of a special assembly tool 84 which is used to install a sleeve element 72 properly on an end of the artery wick portion 44 (FIGS. 4 and 5). The tool 84 is of the form of a rod including a cylindrical head portion 86, a smaller diameter neck portion 88 and a handle portion 90. The head portion 86 has a diameter substantially equal to the diameter of the radially inner artery layer 48 or artery channel 58 (FIG. 2) and fits contiguously against the surface thereof. A sleeve element 72 (FIG. 7) is passed over the head 86 and positioned on neck 88 of the tool 84 with the chamfered end of slit 80 directed towards the head. The head 86 is then inserted into the artery channel 58 until the neck 88 is about halfway in the artery channel, with the sleeve element 72 resting on the outside half of the neck. The sleeve element 72 can be pushed easily onto the end of the artery wick portion 44 with the web 46 sliding into the slit 80 until the unchamfered end is even with the end of the artery wick portion. Withdrawal of the head 86 smoothly rounds out the end of the artery wick portion 44 against the inner surface of the sleeve element 72.

The same procedure is followed with the other end of the artery wick portion 44 of the heat pipe 20. One end of the insert element 70 is then inserted into one end of the artery wick portion 44, and the other end of the insert element is drawn into the other end of the artery wick portion as the ends of the container tube 36 is pulled together and butt welded along their junction 74. After filling with working fluid, and installed in its honeycomb wall 22 (FIG. 2), the heat pipe 20 can be used with practically no further attention. When a part of the heat pipe 20 is heated and another part is not, as indicated in FIG. 1, the working fluid within the heat pipe is vaporized at the heated location and flows through the vapor channel 60 (FIG. 2) to the cold part where it condenses. The condensed liquid is collected in the wick 38 and, by capillary action, drawn largely through web 46 into the artery wire screen layers 48 and 50 and channel 58, and returned to the heated location of the heat pipe 20 back through the web there and recycled to reduce the temperature of the heated area. The condensed liquid collected in the peripheral isotropic wick portion 42 is returned by capillary pumping of a (minor) part of the liquid through the wall wire screen layers 52 and 54 and a (major) part through the web 46 wire screen layers 48 and 50 into the artery layers and channel 58.

Figure 10:
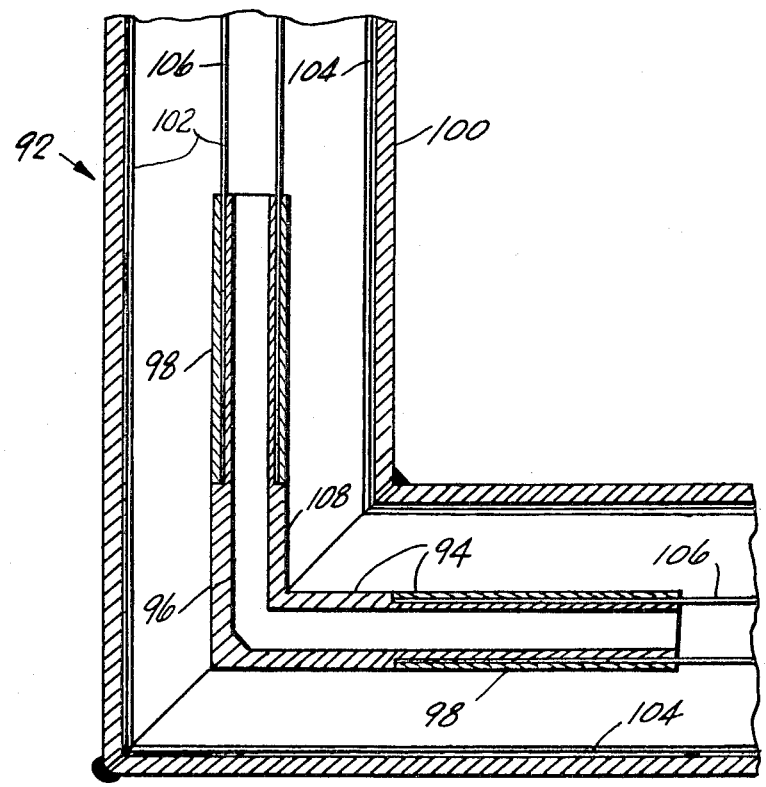
FIG. 10 is a fragmentary sectional view of an artery-type wick heat pipe which utilizes a modified connector means for joining two artery ends together at right angles.

FIG. 10 is a fragmentary sectional view of an artery-type wick heat pipe 92 which utilizes a modified connector means 94 for joining two heat pipe ends at a 90° angle. In this instance, the connector means 94 includes a modified insert element 96 and two regular sleeve elements 98. Container tube 100 of the heat pipe 92 contains the artery-type wick 102 which includes an isotropic wick portion 104 and an artery wick portion 106. The artery wick portion 106 is, of course, connected to the isotropic wick portion 104 by a longitudinal web similar to the web 46 (FIG. 2) of the heat pipe 20. Also, it can be seen that the modified insert element 96 differs from the insert element 70 (FIG. 6) in that the modified insert element has a central 90° elbow portion 108 instead of a flange 78. The elbow portion 108 is preferably kept as short as possible longitudinally to permit better wetting of the wick 102 in the elbow area.

Construction of the 90° joint of heat pipe 92 can, for example, be accomplished as follows: (1) mitering the ends of the container tube 100 and wick 102 at the desired bevel angle; (2) trimming the ends of the artery wick portion 106 square to receive the insert element 96; (3) installing the sleeve elements 98 on respective ends of the artery wick portion 106 with assembly tool 84 (FIG. 9); (4) inserting one end of the insert element 96 in one end of the artery wick portion 106; (5) inserting the other end of the insert element 96 partially into the other end of the artery wick portion 106; (6) pushing the container tube 100 ends together, which also pushes the other end of the insert element 96 fully into the other end of the artery wick portion 106; and (7) butt welding the closed ends of the container tube 100 to complete the joint.

Another form of heat pipe joint can require a Y-shaped or cross-shaped insert member, for example, and it is apparent that the invention can be variously modified for different applications. It is, therefore, to be understood that the exemplary embodiments of this invention and the methods of fabricating the same as described above and shown in the accompanying drawings are merely illustrative of, and not restrictive on, the broad invention and that we do not desire to be limited in our invention to the exact details of construction or steps of fabrication shown and described, for obvious modifications will occur to persons skilled in the art.

We claim:

1. In a heat pipe including a container tube, a longitudinally disposed artery-type wick therein having a peripheral isotropic wick portion, an axial artery wick portion and a radial web connecting said isotropic wick portion with said artery wick portion, and a filling of working fluid, connector means for joining artery wick portion ends together internally at correspondingly joined ends of said container tube and comprising:

an insert element including at least two end portions, a central portion connecting said end portions together, and a passageway extending through said end portions and said central portion, said end portions being adapted to be inserted into closely fitting corresponding ends of said artery wick portion; and at least two sleeve elements each including a longitudinal slit therein, said sleeve elements being installed on respective ends of said artery wick portion to compress the same against the corresponding end portions of said insert element inserted therein, and said web being accommodated in said slits.

2. The invention as defined in claim 1 further comprising a predetermined length of said heat pipe formed into a loop and closed, said connector means joining ends of said artery wick portion together internally at correspondingly joined ends of said container tube whereby a continuous artery-type wick heat pipe is obtained.

3. The invention as defined in claim 1 wherein said central portion of said insert element includes an elbow portion therein.

4. The invention as defined in claim 1 wherein said sleeve elements each has a length nearly equal to that of its corresponding end portion of said insert element.

5. The invention as defined in claim 4 further comprising a predetermined length of said heat pipe formed into a loop and closed, said connector means joining ends of said artery wick portion together internally at correspondingly joined ends of said container tube whereby a continuous artery-type wick heat pipe is obtained.

6. The invention as defined in claim 1 wherein said end portions of said insert element are cylindrical, and said central portion includes a flange providing flat surfaces against which respective ends of said artery wick portion can abut.

7. The invention as defined in claim 1 wherein said end portions of said insert element are cylindrical and each has a length relative to its diameter of the order of about 5 to 1.

8. The invention as defined in claim 7 wherein said sleeve elements each has a length nearly equal to that of its corresponding end portion of said insert element.

9. The invention as defined in claim 8 further comprising a predetermined length of said heat pipe formed into an annular ring and closed, said connector means joining ends of said artery wick portion together internally at correspondingly joined ends of said container tube whereby a continuous, annular, artery-type wick heat pipe is obtained.

10. The invention as defined in claim 9 wherein said connector means has selected relative dimensions and characteristics to avoid excessive absorption of heat whereby burnout is precluded in said heat pipe.

* * * * *